United States Patent
Baron et al.

(10) Patent No.: US 9,740,544 B2
(45) Date of Patent: Aug. 22, 2017

(54) LIVE SNAPSHOTTING OF MULTIPLE VIRTUAL DISKS IN NETWORKED SYSTEMS

(71) Applicant: Red Hat Israel, Ltd., Raanana (IL)

(72) Inventors: Ayal Baron, Kiryat Ono (IL); Federico Simoncelli, Fano (IT)

(73) Assignee: Red Hat Israel, Ltd., Raanana (IL)

( * ) Notice: Subject to any disclaimer, the term of this patent is extended or adjusted under 35 U.S.C. 154(b) by 225 days.

(21) Appl. No.: 13/777,911

(22) Filed: Feb. 26, 2013

(65) Prior Publication Data

US 2014/0244951 A1  Aug. 28, 2014

(51) Int. Cl.
G06F 3/06 (2006.01)
G06F 11/00 (2006.01)
G06F 9/455 (2006.01)
G06F 11/07 (2006.01)

(52) U.S. Cl.
CPC ............ G06F 11/00 (2013.01); G06F 3/06 (2013.01); G06F 9/455 (2013.01); G06F 9/45558 (2013.01); G06F 11/0727 (2013.01); G06F 11/0793 (2013.01); G06F 3/065 (2013.01); G06F 2009/45579 (2013.01)

(58) Field of Classification Search
CPC ............ G06F 3/0646; G06F 11/1446; G06F 17/30088; G06F 3/065; G06F 3/0653; G06F 2201/84
USPC ........................................................ 711/162
See application file for complete search history.

(56) References Cited

U.S. PATENT DOCUMENTS

| | | | | |
|---|---|---|---|---|
| 7,739,352 B2* | 6/2010 | Wong | ............... | G06F 17/30088 709/217 |
| 8,713,271 B2* | 4/2014 | Sundrani | ............ | G06F 11/1461 711/162 |
| 9,037,547 B1* | 5/2015 | Shivdeo | ............ | G06F 17/30575 707/664 |
| 9,098,461 B2* | 8/2015 | Simoncelli | ............. | G06F 12/16 |
| 2004/0030846 A1* | 2/2004 | Armangau | .......... | G06F 11/1469 711/154 |
| 2005/0165867 A1* | 7/2005 | Barton | ................ | G06F 11/1464 |
| 2006/0053260 A1* | 3/2006 | Kodama | ............. | G06F 11/1666 711/162 |
| 2009/0217255 A1* | 8/2009 | Troan | ........................ | G06F 8/65 717/168 |
| 2009/0327355 A1* | 12/2009 | Wong | ................ | G06F 17/30088 |
| 2014/0081911 A1* | 3/2014 | Deshpande | ......... | G06F 11/1448 707/610 |

* cited by examiner

*Primary Examiner* — Ann J. Lo
*Assistant Examiner* — Tracy A Warren
(74) *Attorney, Agent, or Firm* — Lowenstein Sandler LLP

(57) ABSTRACT

A system and method are disclosed for servicing requests to create live snapshots of a plurality of virtual disks in a virtualized environment. In accordance with one example, a first computer system detects that a second computer system has issued one or more commands to create a first snapshot of a first virtual disk of a virtual machine and a second snapshot of a second virtual disk of the virtual machine while the virtual machine is running on the second computer system. In response to a determination that the creating of the second snapshot failed, the first computer system issues one or more commands to destroy the first snapshot and deallocate an area of a storage device that stores the first snapshot.

17 Claims, 3 Drawing Sheets

LIVE SNAPSHOTTING OF MULTIPLE VIRTUAL DISKS IN NETWORKED SYSTEMS

TECHNICAL FIELD

This disclosure relates to computer systems, and more particularly, to live snapshotting in virtualized networked computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method by which a network of computer systems may service requests to create live snapshots of a plurality of virtual disks of one or more virtual machines (VMs). A snapshot of a virtual disk of a VM is a file that captures the state of the virtual disk at a particular point in time. A live snapshot of a virtual disk of a VM is a snapshot that is taken while the VM is executing (i.e., a snapshot that is taken without first shutting down the VM).

In accordance with one example, a first computer system detects that a second computer system has issued one or more commands to create live snapshots of a plurality of virtual disks, where the plurality of virtual disks belong to one or more virtual machines running on the second computer system. In one example, the first computer system determines whether creation of any of the live snapshots failed, and if so:

issues one or more commands to:
  destroy any live snapshots that were successfully created, and
  deallocate area(s) of storage device(s) that formerly stored the destroyed snapshots; and
returns a value (e.g., a failure code, an error message, etc.) to the sender of the request indicating that none of the live snapshots were created.

Alternatively, if all of the live snapshots were successfully created, one or more values are returned to the sender that indicate that the request was serviced and provide references (e.g., addresses, file names, etc.) to the live snapshots.

The present disclosure can thus enable the creation of a consistent set of live snapshots of a plurality of virtual disks, without requiring shutdown of the virtual machine(s) to which the virtual disks belong. Moreover, the present disclosure enables such functionality in a networked environment, so that a first computer system in the network can detect snapshotting failures by a second computer system in the network and can destroy and deallocate all of the snapshots, thereby guaranteeing that when live snapshots are in fact created, all of the virtual disks have been snapshotted correctly and at the same point in time.

Figure 1:
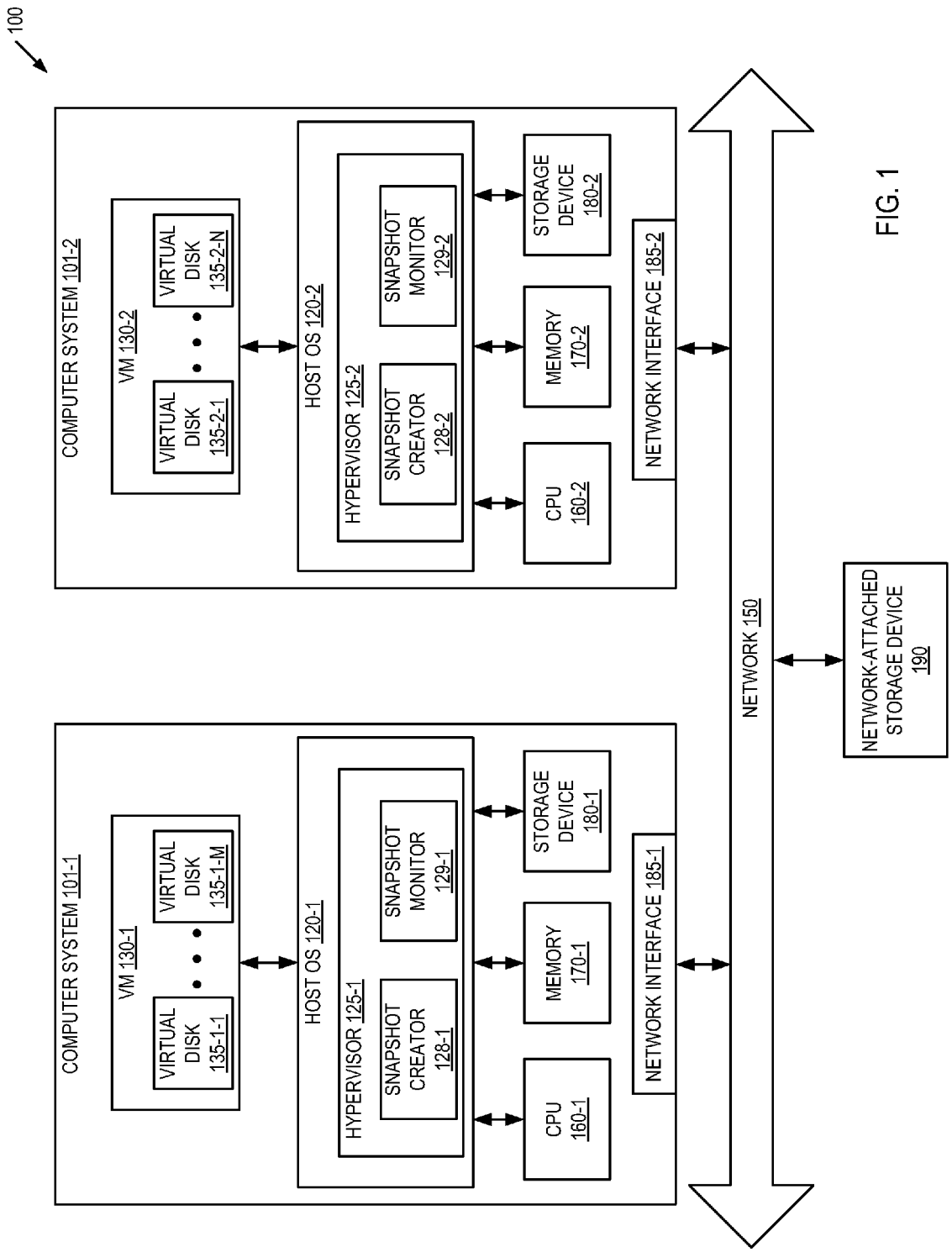
FIG. 1 depicts an illustrative system architecture, in accordance with the present disclosure.

FIG. 1 depicts an illustrative architecture of a computer system 100, in accordance with an example of the present invention. It should be noted that other architectures for computer system 100 are possible, and that examples of a system utilizing the disclosure are not necessarily limited to the specific architecture depicted by FIG. 1.

As shown in FIG. 1, system 100 comprises a computer system 101-1, a second computer system 101-2, and a network-attached storage device 190 connected via a network 150. Each of computer systems 101-1 and 101-2 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). In some embodiments, computer systems 101-1 and 101-2 may belong to a cluster comprising additional computer systems not depicted in FIG. 1, while in some other embodiments, computer systems 101-1 and 101-2 may be independent systems that are capable of communicating via network 150.

Storage device 190 is a network-attached storage (NAS) that is capable of storing data (e.g., files, virtual disks, snapshots, etc.) and of being written to and read from by computer systems 101-1 and 101-2 via network 150. It should be noted that, for simplicity, a single network-attached storage device 190 is depicted in FIG. 1; however, in some other examples system 100 may comprise a plurality of such network-attached storage devices.

Each of computer systems 101-1 and 101-2 comprises a central processing unit (CPU) 160, a memory 170, which may include volatile memory devices (e.g., random access memory (RAM)), non-volatile memory devices (e.g., flash memory), and/or other types of memory devices, a storage device 180 (e.g., a magnetic hard disk, a Universal Serial Bus [USB] solid state drive, etc.), and a network interface device 185 that enables transmission and receipt of messages via network 150. It should be noted that the fact that a single CPU is depicted in FIG. 1 for each of computer systems 101-1 and 101-2 is merely illustrative, and that in some other examples one or both of computer systems 101-1 and 101-2 may comprise a plurality of CPUs.

Computer system 101-1 runs a host operating system (OS) 120-1 that manages the hardware resources of the computer system and that provides functions such as interprocess communication, scheduling, virtual memory management, and so forth. In one example, host operating system 120-1 also comprises a hypervisor 125-1, which is software that provides a virtual operating platform for virtual machine 130-1 and that manages the execution of virtual machine 130-1. It should be noted that in some alternative examples, hypervisor 125-1 may be external to host OS 120-1, rather than embedded within host OS 120-1.

Virtual machine 130-1 is a software implementation of a machine that executes programs as though it were an actual physical machine. As shown in FIG. 1, virtual machine 130-1 comprises M virtual disks 135-1-1 through 135-1-M, each of which is mapped to a respective file stored on storage device 180-1 or network-attached storage device 190, where M is a positive integer. Virtual machine 130-1 also comprises a guest operating system (not depicted in FIG. 1) that manages files and programs within the virtual machine. It should be noted that although, for simplicity, FIG. 1 depicts a single virtual machine 130-1 hosted by computer system 101-1, in some examples computer system 101-1 may host a plurality of virtual machines.

In accordance with one example, hypervisor 125-1 includes a snapshot creator 128-1 that is capable of issuing commands to create snapshots of virtual disks (e.g., files or devices that capture the contents of the virtual disks at a particular point in time). In some embodiments, snapshot creator 128-1 is capable of issuing such commands only for virtual disks of virtual machines hosted by computer system 101-1 (e.g., virtual disks 135-1-1 through 135-1-M of VM 130-1), while in some other embodiments, snapshot creator 128-1 may be capable of issuing commands to create snapshots of virtual disks of VMs hosted by another computer system (e.g., virtual disks 135-2-1 through 135-1-N of VM 130-2, etc.) as well as for VMs hosted by computer system 101-1.

In accordance with one example, hypervisor 125-1 also includes a snapshot monitor 129-1 that is capable of determining when a live snapshot created by another computer system (e.g., computer system 101-2, etc.) has failed, and of issuing commands to destroy snapshots residing on computer system 101-1 (e.g., residing on storage device 180-1, etc.), deallocate areas of storage devices belonging to computer system 101-1 (e.g., storage device 180-1, etc.) that store snapshots, destroy snapshots residing on network-attached storage devices (e.g., storage device 190, etc.), deallocate areas of network-attached storage devices that store snapshots, destroy snapshots residing on another computer system (e.g., computer system 101-2, etc.), and deallocate areas of storage devices belonging to another computer system (e.g., computer system 101-2, etc.) that store snapshots.

It should be noted that in some embodiments, snapshot monitor 129-1 may have the capability to determine when a live snapshot created by snapshot creator 128-1 has failed, in addition to the capability to determine when a live snapshot created by some other computer system has failed. Similarly, in some embodiments snapshot creator 128-1 may have the capability to determine when the creation of a live snapshot has failed, either in addition to, or instead of, snapshot monitor 129-1.

It should further be noted that in some alternative examples, one or both of snapshot creator 128-1 and snapshot monitor 129-1 may be external to hypervisor 125-1, rather than embedded within hypervisor 125-1 (e.g., modules of host OS 120-1 external to hypervisor 125-1, etc.). Some operations of snapshot creator 128-1 and snapshot monitor 129-1 are described in detail below with respect to the method of FIG. 2.

Computer system 101-2, like computer system 101-1, runs a host operating system (OS) 120-2 that manages the hardware resources of the computer system and that provides functions such as interprocess communication, scheduling, virtual memory management, and so forth. In one example, host operating system 120-2 also comprises a hypervisor 125-2, which is software that provides a virtual operating platform for virtual machine 130-2 and that manages the execution of virtual machine 130-2. It should be noted that in some alternative examples, hypervisor 125-2 may be external to host OS 120-2, rather than embedded within host OS 120-2.

Virtual machine 130-2, like virtual machine 130-1, is a software implementation of a machine that executes programs as though it were an actual physical machine. As shown in FIG. 1, virtual machine 130-2 comprises N virtual disks 135-2-1 through 135-2-N, each of which is mapped to a respective file stored on storage device 180-2 or network-attached storage device 190, where N is a positive integer that may or may not be equal to M. Virtual machine 130-2, like virtual machine 130-1, also comprises a guest operating system (not depicted in FIG. 1) that manages files and programs within the virtual machine. It should be noted that although, for simplicity, FIG. 1 depicts a single virtual machine 130-2 hosted by computer system 101-2, in some examples computer system 101-2 may host a plurality of virtual machines.

In accordance with one example, hypervisor 125-2 includes a snapshot creator 128-2 that is capable of issuing commands to create snapshots of virtual disks. In some embodiments, snapshot creator 128-2 is capable of issuing such commands only for virtual disks of virtual machines hosted by computer system 101-2 (e.g., virtual disks 135-2-1 through 135-2-N of VM 130-2), while in some other embodiments, snapshot creator 128-2 may be capable of issuing commands to create snapshots of virtual disks of VMs hosted by another computer system (e.g., virtual disks 135-1-1 through 135-1-M of VM 130-1, etc.) as well as for VMs hosted by computer system 101-2. In one example, snapshot creator 128-2 is also capable of detecting when creation of a snapshot fails.

In accordance with one example, hypervisor 125-2 also includes a snapshot monitor 129-2 that is capable of determining when a live snapshot created by another computer system (e.g., computer system 101-1, etc.) has failed, and of issuing commands to destroy snapshots residing on computer system 101-2 (e.g., residing on storage device 180-2, etc.), deallocate areas of storage devices belonging to computer system 101-2 (e.g., storage device 180-2, etc.) that store snapshots, destroy snapshots residing on network-attached storage devices (e.g., storage device 190, etc.), deallocate areas of network-attached storage devices that store snapshots, destroy snapshots residing on another computer system (e.g., computer system 101-1, etc.), and deallocate areas of storage devices belonging to another computer system (e.g., computer system 101-1, etc.) that store snapshots.

It should be noted that in some embodiments, snapshot monitor 129-2 may have the capability to determine when a live snapshot created by snapshot creator 128-2 has failed, in addition to the capability to determine when a live snapshot created by some other computer system has failed. Similarly, in some embodiments snapshot creator 128-2 may have the capability to determine when the creation of a live snapshot has failed, either in addition to, or instead of, snapshot monitor 129-2.

It should further be noted that in some alternative examples, one or both of snapshot creator 128-2 and snapshot monitor 129-2 may be external to hypervisor 125-2, rather than embedded within hypervisor 125-2 (e.g., modules of host OS 120-2 external to hypervisor 125-2, etc.). Some operations of snapshot creator 128-2 and snapshot monitor 129-2 are described in detail below with respect to the method of FIG. 2.

Figure 2:
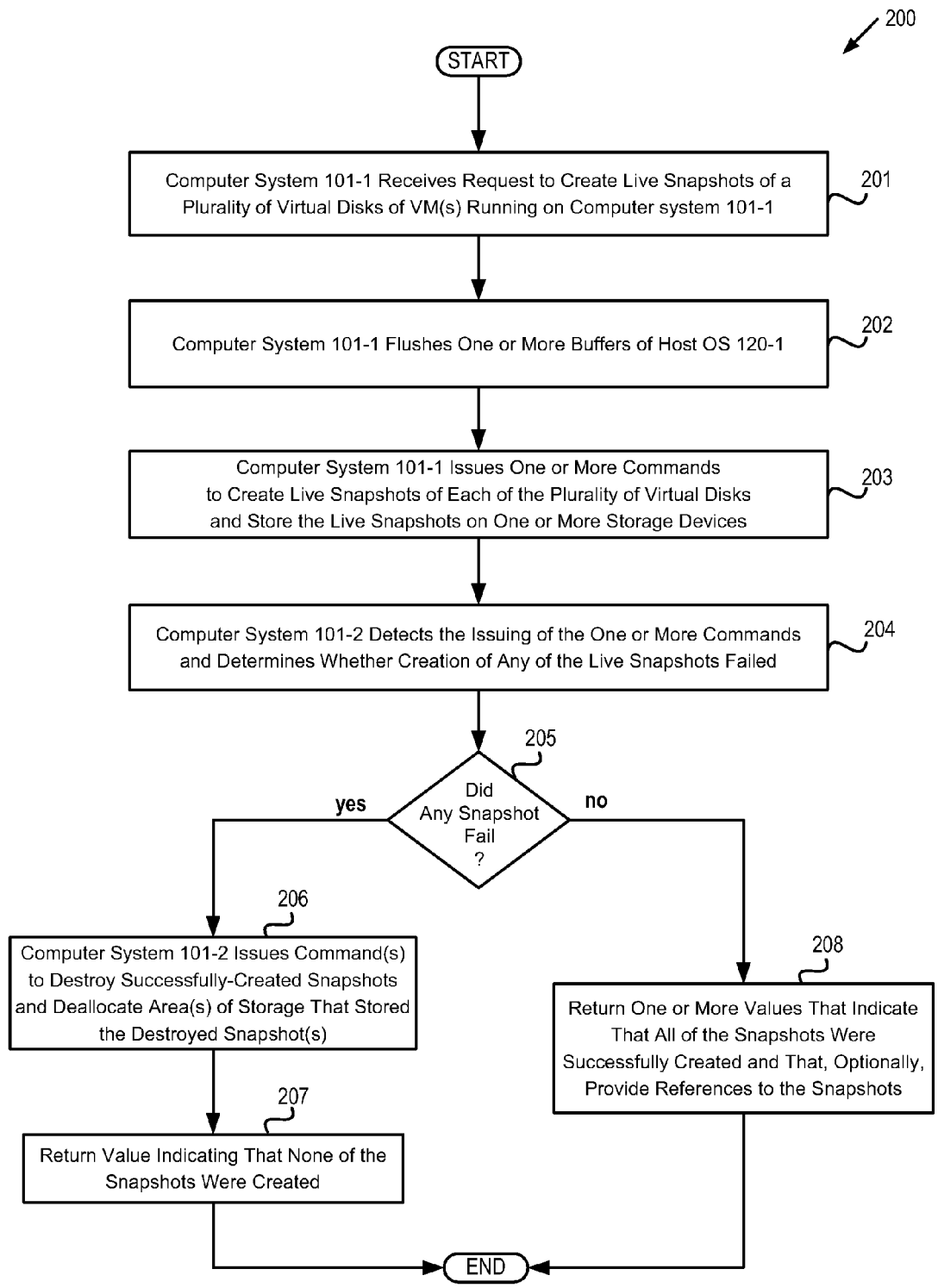
FIG. 2 depicts a flow diagram of one example of a method for servicing a request to create live snapshots of a plurality of virtual disks.

FIG. 2 depicts a flow diagram of one example of a method 200 for servicing a request to create live snapshots of a plurality of virtual disks. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine. It should be noted that blocks depicted in FIG. 2 can be performed simultaneously or in a different order than that depicted.

It should further be noted that the plurality of virtual disks may all belong to a single executing virtual machine, or they may belong to a plurality of executing virtual machines. In the latter case, the plurality of virtual disks may be distributed among the plurality of virtual machines in any possible combination (e.g., one virtual disk belonging to a first VM and one virtual disk belonging to a second VM; two virtual disks belonging to a first VM and four virtual disks belonging to a second VM; three virtual disks belonging to a first VM, one virtual disk belonging to a second VM, and seven virtual disks belonging to a third VM; etc.).

At block 201, computer system 101-1 receives a request to create live snapshots of a plurality of virtual disks of one or more virtual machines running on computer system 101-1 (e.g., virtual machine 130-1, another VM running on computer system 101-1 not depicted in FIG. 1, etc.). As noted above, the plurality of virtual disks may all belong to a single executing virtual machine or may belong to a plurality of executing virtual machines. The request may be submitted by an administrator of computer system 101-1, or by an application executing on computer system 101-1, or by some other program (e.g., a system administration-related script that executes on computer system 101-1, an application that executes on another machine connected to computer system 100-1 via network 150, etc.). In one example, the request is received by snapshot creator 128-1 of computer system 101-1.

At block 202, computer system 101-1 flushes one or more buffers of host operating system 120-1 (e.g., the contents of the one or more buffers are discarded, leaving the buffer(s) empty) in preparation for creation of the live snapshots. In one example, a plurality of buffers are flushed, each associated with a respective virtual disk, while in another example, each buffer to be flushed is associated with a respective virtual machine, while in yet another example, a single buffer is flushed. In one example, computer system 101-1 may also freeze input to and output from the virtual machine(s) to which the plurality of virtual disks belong. In some embodiments, block 202 is performed by snapshot creator 128-1, while in some other embodiments, block 202 may be performed by a process executing within a virtual machine hosted by computer system 101-1 in response to a request from host operating system 120-1.

At block 203, computer system 101-1 issues one or more commands to create live snapshots of each of the plurality of virtual disks and store the live snapshots on one or more storage devices (e.g., storage device 180-1, network attached storage device 190, etc.). In one example, computer system 101-1 issues a plurality of commands at block 203, each of which is to create and store a live snapshot of a respective one of the plurality of virtual disks (e.g., a first command for creating and storing a live snapshot of a first virtual disk, a second command for creating and storing a live snapshot of a second virtual disk, etc.), while in some other examples, computer system 101-1 issues a first plurality of commands to create the live snapshots and a second plurality of commands to store the live snapshots on one or more storage devices. In some other examples, computer system 101-1 issues a first command to create all of the live snapshots and a second command to store all of the live snapshots, while in still other examples, computer system 101-1 issues a single command to create and store all of the live snapshots. In yet other examples, computer system 101-1 may issue a plurality of commands that do not correspond in a one-to-one fashion with the plurality of virtual disks (e.g., a first command for creating and storing a live snapshot of a first virtual disk and a second virtual disk, a second command for creating a live snapshot of a third virtual disk, a third command for storing the live snapshot of the third virtual disk, etc.).

In one example, when the network-attached storage device 190 supports native snapshotting (e.g., a capability by which the storage device can create snapshots), the snapshot creator 128-1 may issue one or more commands to a native snapshotting module on the network-attached storage device 190 to create the live snapshots. Alternatively (e.g., when the network-attached storage device 190 lacks a native snapshotting capability, etc.), the snapshot creator 128-1 may issue one or more commands to hypervisor 125-1 or host OS 120-1 to create the live snapshots. In one example, snapshot creator 128-1 may issue a query to network-attached storage device 190 to determine whether the storage device supports native snapshotting. In another example, snapshot creator 128-1 may obtain this information from hypervisor 125-1 or host OS 120-1. It should be noted that the live snapshots created at block 203 may all be stored on the same storage device, or may be stored on a plurality of storage devices (e.g., each virtual disk on a respective storage device, half of the virtual disks on a first storage device and the other half on a second storage device, etc.).

In one example, computer system 101-1 may freeze input to the virtual machine(s) to which the plurality of virtual disks belong, and may freeze output from these virtual machines, during the creation of the snapshots at block 203. Similarly, computer system 101-1 may queue requests to the plurality of virtual disks (e.g., read requests, write requests, etc.) during the creation of the snapshots. In one example, block 203 is performed by snapshot creator 128-1.

At block 204, computer system 101-2 detects the issuing of the one or more more commands by computer system 101-1 at block 203. In some examples, the detection may be via an error returned by host OS 120-1 when the file or device containing the snapshot is opened, while in some other examples, the detection may be via an error returned by hypervisor 125-1 in response to an inability to read the contents of the snapshot (e.g., an unreadable snapshot, incorrect format, etc.), while in yet other examples, the detection may be via some other type of mechanism. In response to the detection, computer system 101-2 begins a snapshot monitoring operation to determine whether creation of any of the live snapshot(s) at block 203 failed. In one example, snapshot monitor 129-2 checks whether a live snapshot was created successfully by checking that the storage area for the live snapshot exists, that the storage area has been properly initialized (e.g., not corrupted, etc.), that the storage area has the appropriate permissions (e.g., read permissions, write permissions, etc.), that a new file or device associated with the live snapshot can be successfully opened (e.g., in order to store a change [or "delta"] to the snapshot, etc.), and so forth. In one example, the location of the storage area is specified by metadata stored on the storage device (e.g., storage device 180-1, network-attached storage device 190, etc.) and read by host OS 120-1 or hypervisor 125-1. It should be noted that in some embodiments, snapshot creator 128-2 may perform block 204 instead of snapshot monitor 129-2, while in yet other embodiments, computer system 101-1 itself may perform block 204 rather than computer system 101-2.

Block 205 branches based on whether creation of any of the live snapshots failed. If so, execution proceeds to block 206, otherwise execution continues at block 208.

At block 206, computer system 101-2 issues one or more commands to destroy the successfully-created live snapshots and deallocate the area(s) of storage that formerly stored these live snapshots. In examples where I/O of the VM(s) to which the plurality of virtual disks belong was frozen at block 202 or block 203, I/O of the VM(s) is resumed at block 206. In some such examples, I/O may be resumed after the destroying of the snapshot and the deallocation of storage, while in some other such examples, I/O may be resumed before the destroying of the snapshot and the deallocation of storage. In accordance with some embodiments, block 206 is performed by snapshot monitor 129-2.

At block 207, a value (e.g., a failure code, an error message, etc.) is returned to the sender of the request indicating that none of the live snapshots were created. In one example, the value is returned by computer system 101-2 to the sender via network 150.

At block 208, one or more values are returned to the sender that indicate that the request was serviced and that, optionally, provide references (e.g., addresses, file names, etc.) to the live snapshots. In one example, the one or more values are returned by computer system 101-2 to the sender via network 150.

It should be noted that in some examples, computer system 101-2 may require permission in order to participate in the snapshotting of computer system 101-1 as described above. Such permission may be granted by an administrator of computer system 101-1, by a program executed by computer system 101-1, by an administrator of networked computer system 100, etc. In some such examples, the method of FIG. 2 may be modified to include an initial block that checks whether computer system 101-2 has the requisite permissions to participate in the snapshotting of computer system 101-1, while in some other such examples, the method of FIG. 2 may be modified to include an initial block that identifies a particular computer system in networked system 100 having the appropriate permissions to participate in the snapshotting of computer system 101-1.

Figure 3:
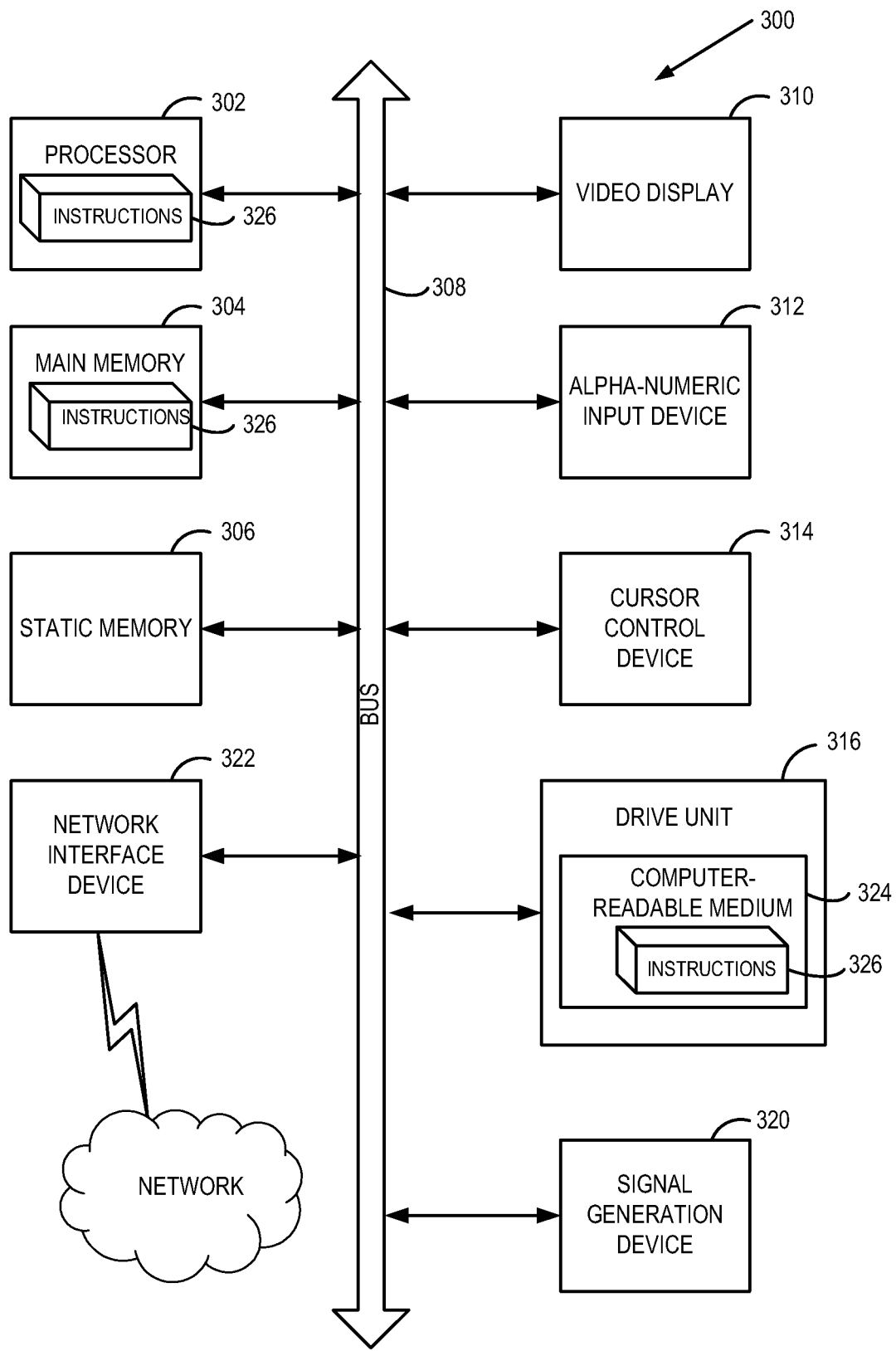
FIG. 3 depicts a block diagram of an illustrative computer system operating in accordance with examples of the invention.

FIG. 3 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the methods of FIGS. 2 and 3, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "issuing", "detecting", "determining", "destroying", "flushing", "freezing", "queueing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

detecting, by a processing device of a first computer system, that a second computer system running a virtual machine has issued one or more commands to create a first snapshot of a first virtual disk of the virtual machine and a second snapshot of a second virtual disk of the virtual machine;

determining, by the processing device of the first computer system, whether the creating of the first snapshot of the first virtual disk completed successfully;

determining, by the processing device of the first computer system, whether the creating of the second snapshot of the second virtual disk on the second computer system failed; and in response to a determination by the first computer system that the creating of the second snapshot of the second virtual disk on the second computer system failed and that the creating of the first snapshot of the first virtual disk completed successfully, issuing, by the first computer system, one or more commands to the second computer system to destroy the first snapshot of the first virtual disk on the second computer system and deallocate an area of a storage device that stores the first snapshot, wherein the first snapshot is of the first virtual disk of the virtual machine on the second computer system.

2. The method of claim 1, wherein the determination that the creating of the second snapshot failed is further performed by the second computer system.

3. The method of claim 1, wherein the issuing of the one or more commands to create the first snapshot and the second snapshot is in response to a request to create snapshots of the first virtual disk and the second virtual disk.

4. The method of claim 3, further comprising returning a value that indicates to a sender of the request that neither of the snapshots were created.

5. The method of claim 1, wherein the first virtual disk is stored on a storage device, and wherein the first snapshot is created by the storage device.

6. The method of claim 1, wherein the first snapshot is created by a hypervisor of the second computer system.

7. The method of claim 1, wherein a buffer of a host operating system of the second computer system is flushed prior to the issuing of the one or more commands to create the first snapshot and the second snapshot.

8. The method of claim 1, wherein, during the creating of the first snapshot, input/output of the virtual machine is frozen and requests to the first virtual disk are queued.

9. A system comprising:
a network interface to connect a first computer system, via a network, to a second computer system running a first virtual machine and a second virtual machine; and
a processing device of the first computer system operatively coupled to the network interface, the processing device to:
detect that the second computer system has issued one or more commands to create a first snapshot of a first virtual disk of the first virtual machine and a second snapshot of a second virtual disk of the second virtual machine;
determine whether the creating of the first snapshot of the first virtual disk completed successfully;
determine whether the creating of the second snapshot of the second virtual disk on the second computer system failed; and
in response to a determination by the first computer system that the creating of the second snapshot of the second virtual disk on the second computer system failed and that the creating of the first snapshot of the first virtual disk completed successfully, issue one or more commands to the second computer system to destroy the first snapshot of the first virtual disk on the second computer system and deallocate an area of a storage device that stores the first snapshot, wherein the first snapshot is of the first virtual disk of the virtual machine on the second computer system.

10. The system of claim 9, wherein the determination that the creating of the second snapshot failed is further performed by the first computer system.

11. The system of claim 9, wherein the issuing of the one or more commands to create the first snapshot and the second snapshot is in response to a request to create snapshots of the first virtual disk and the second virtual disk.

12. The system of claim 9, wherein the first virtual disk is stored on a storage device, and wherein the first snapshot is created by the storage device.

13. The system of claim 9, wherein the first snapshot is created by a hypervisor of the second computer system.

14. The system of claim 9, wherein the first snapshot is created by a host operating system of the second computer system.

15. A non-transitory computer readable storage medium, having instructions stored therein, which when executed, cause a processing device of a first computer system to:
detect, by the processing device of the first computer system, that a second computer system running a first virtual machine and a second virtual machine has issued one or more commands to create a first snapshot of a first virtual disk of the virtual machine and a second snapshot of a second virtual disk of the virtual machine;
determine whether the creating of the first snapshot of the first virtual disk completed successfully;
determine whether the creating of the second snapshot of the second virtual disk on the second computer system failed; and
in response to a determination by the first computer system that the creating of the second snapshot of the second virtual disk on the second computer system failed and that the creating of the first snapshot of the first virtual disk completed successfully, issue, by the first computer system, one or more commands to the second computer system to destroy the first snapshot of the first virtual disk on the second computer system and deallocate an area of a storage device that stores the first snapshot, wherein the first snapshot is of the first virtual disk of the virtual machine on the second computer system.

16. The non-transitory computer readable storage medium of claim 15, wherein the determination that the creating of the second snapshot failed is further performed by the second computer system.

17. The method of claim 1, wherein a buffer of a host operating system of the second computer system is flushed prior to the issuing of the one or more commands to create the first snapshot and the second snapshot; and wherein, during the creating of the first snapshot, input/output of the virtual machine is frozen and requests to the first virtual disk are queued.

* * * * *